(12) United States Patent
Marshall et al.

(10) Patent No.: US 12,735,132 B2
(45) **Date of Patent: *Sep. 15, 2026**

(54) LOCKING WALL-MOUNTED BICYCLE RACKS

(71) Applicant: Ryan Marshall, Kaysville, UT (US)

(72) Inventors: Ryan Marshall, Kaysville, UT (US); Jonathan Dietrich, Franklin, ID (US)

(73) Assignee: Ryan Marshall, Kaysville, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/040,168

(22) Filed: Jan. 29, 2025

(65) Prior Publication Data

US 2025/0304199 A1 Oct. 2, 2025

Related U.S. Application Data

(63) Continuation of application No. 18/624,475, filed on Apr. 2, 2024, now Pat. No. 12,227,250.

(51) Int. Cl.
*B62H 3/12* (2006.01)

(52) U.S. Cl.
CPC ......... *B62H 3/12* (2013.01); *B62H 2700/005* (2013.01)

(58) Field of Classification Search
CPC ... B62H 3/00; B62H 3/02; B62H 3/04; B62H 3/08; B62H 3/10; B62H 3/12; B62H 2700/005
USPC ...................................................... 211/17–24
See application file for complete search history.

(56) References Cited

U.S. PATENT DOCUMENTS 3,865,244 A * 2/1975 Galen ...................... B62H 3/08 211/5
3,934,436 A * 1/1976 Candlin ................... B62H 3/02 211/5
3,950,972 A * 4/1976 Bleier .................... B62H 5/003 70/49
3,964,611 A * 6/1976 Galen ...................... B62H 3/08 211/8
3,970,196 A * 7/1976 Legge ....................... B60R 9/10 211/5
4,700,845 A * 10/1987 Fretter ..................... B62H 3/12 211/5

(Continued)

FOREIGN PATENT DOCUMENTS

DE 3320369 A * 12/1984 ............... B62H 3/12
DE 29618873 U1 * 5/1997 ............... B62H 3/00

(Continued)

OTHER PUBLICATIONS

Translation.*

(Continued)

*Primary Examiner* — Patrick D Hawn

(57) ABSTRACT

A bicycle rack is disclosed. The rack includes (a) a support member having a first portion configured to be mounted on a wall and a second portion, disposed at an angle relative to the first portion, configured to support the pedal of a bicycle; and (b) a cover member pivotably mounted on the first portion of the support member, the cover member being configured to move between an open position in which the support member is uncovered and a closed position in which the support member is covered.

16 Claims, 24 Drawing Sheets

(56) References Cited

U.S. PATENT DOCUMENTS

| | | | | | |
|---|---|---|---|---|---|
| 4,749,089 | A * | 6/1988 | Stewart, III | B62H 3/12 | 248/447 |
| 4,811,577 | A * | 3/1989 | Webster | E05B 67/003 | 70/49 |
| 5,244,101 | A * | 9/1993 | Palmer | B62H 3/00 | 211/5 |
| 5,323,915 | A * | 6/1994 | Fortune, Sr. | E05B 71/00 | 211/5 |
| 5,447,241 | A * | 9/1995 | Bureau | B62H 3/02 | 211/5 |
| 5,662,256 | A * | 9/1997 | Bryan | B60R 9/10 | 224/523 |
| 5,887,461 | A * | 3/1999 | Heffley | E05B 71/00 | 211/8 |
| 6,830,363 | B2 * | 12/2004 | Pisula | B62J 11/19 | 362/474 |
| 6,896,232 | B2 * | 5/2005 | Crowell | B25B 5/06 | 248/316.4 |
| 7,770,419 | B2 * | 8/2010 | Stone | B62H 3/02 | 292/281 |
| 8,794,454 | B2 * | 8/2014 | Bleazard | B62H 3/08 | 211/5 |
| 8,959,965 | B2 * | 2/2015 | Gray | B62H 5/10 | 70/234 |
| 9,302,725 | B2 * | 4/2016 | Ton | B62J 9/30 | |
| 9,840,855 | B2 * | 12/2017 | Lin | B62H 3/00 | |
| 11,142,271 | B1 * | 10/2021 | Gu | B62H 3/06 | |
| 11,161,561 | B1 * | 11/2021 | Gu | B62H 3/12 | |
| 11,400,989 | B2 * | 8/2022 | Sørensen | B62H 3/10 | |
| 2006/0249466 | A1 * | 11/2006 | Wang | B62H 3/02 | 211/17 |
| 2021/0053635 | A1 * | 2/2021 | Davies | B62H 3/00 | |

FOREIGN PATENT DOCUMENTS

| | | | | |
|---|---|---|---|---|
| DE | 102009056573 | A1 * | 6/2011 | B62H 3/12 |
| DE | 102023110676 | A1 * | 10/2024 | B62H 3/12 |
| DK | 201700496 | A1 * | 3/2019 | B62H 3/10 |
| GB | 2544736 | A * | 5/2017 | B62H 3/12 |
| GB | 2613047 | A * | 5/2023 | B62H 3/12 |
| SK | 142021 | U1 * | 5/2022 | |

OTHER PUBLICATIONS

Eapele, “Eapele Bike Pedal Hanger Bicycle Wall Mount Horizontal Hanger, Heavy-duty 1 0GA Steel Plates Made, 1 Support to 150lb, Compatible with Platform Pedal, Clipless Pedal, and Hybrid Pedal”, www.amazon.com, retrieved online Apr. 2, 2024, 8 pages.

Non-Final Office Action in U.S. Appl. No. 18/624,475 mailed on Aug. 9, 2024, 10 pages.

Notice of Allowance in U.S. Appl. No. 18/624,475 mailed on Nov. 13, 2024, 9 pages.

* cited by examiner

LOCKING WALL-MOUNTED BICYCLE RACKS

RELATED APPLICATION

This application is a continuation of U.S. patent application Ser. No. 18/624,475, filed Apr. 2, 2024, the entire disclosure of which is incorporated herein by reference.

BACKGROUND

Many different types of bicycle racks are known. It is often advantageous for users with limited floor space to suspend their bicycles from a wall or ceiling. One type of rack designed for suspending a bicycle from a wall includes a bracket referred to as a pedal hook, which is typically a generally L-shaped member one leg of which is fastened (e.g., screwed) to the wall and the other leg of which supports a pedal of the bicycle.

SUMMARY

The present disclosure features wall mounted bicycle racks that allow a bicycle to be secured to a wall by mounting a pedal of the bicycle on the rack. Because the racks described herein can be securely closed, and in some implementations locked, the risk of theft if the bicycle is stored in a garage, the door of which may accidentally be left open, is greatly reduced. Moreover, in preferred implementations the racks are designed to prevent a thief from being able to remove the rack from the wall.

In one aspect, the present disclosure features a wall-mounted bicycle rack, the rack comprising: (a) a support member having a first portion configured to be mounted on a wall and a second portion, disposed at an angle relative to the first portion, configured to support the pedal of a bicycle; and (b) a cover member pivotably mounted on the first portion of the support member, the cover member being configured to move between an open position in which the support member is uncovered and a closed position in which the support member is covered.

Some implementations may include one or more of the following features.

The bicycle rack may also include a locking mechanism configured to lock the cover member in the closed position.

The locking mechanism may include a first locking feature on the cover member and a second locking feature on the support member.

In some cases, the first locking feature and second locking feature include apertures on the cover member and support member that align when the cover member is in the closed position, allowing a separate lock to be threaded through the apertures.

Alternatively, first locking feature may include a locking mechanism mounted on the cover member, the locking mechanism including a latch member slidably mounted to move between a retracted position and an extended position, and the cover member may include an aperture into which the latch member slides when the latch member is in the extended position and the cover member is in the closed position. The locking mechanism may also include a lock configured to prevent movement of the latch member, e.g., a barrel-style combination lock. The latch member may be biased toward the extended position.

In some implementations the cover member is biased toward the open position. For example, the cover member may be biased away from the support member by a torsion spring.

The first portion of the support member (the portion mounted on the wall) may include holes configured to receive threaded fasteners. For enhanced theft prevention, the first portion may be configured so that the holes are inaccessible when the cover member is in the closed position.

The cover member may be pivotably mounted by a hinge. In some cases, the hinge may include aligned openings in the cover member and the first portion and a pin extending through the aligned openings.

The second portion of the support member (the portion that supports the pedal) may include an angled support surface and/or a forked portion configured to receive and support a spindle of a pedal of a bicycle. The cover member may also include a generally cup-shaped portion configured to fit over a crank arm attached to the pedal of the bicycle when the cover member is in the closed position.

The first portion of the support member may have an angled rear surface, configured so that a longitudinal axis of the support member is disposed at an angle relative to a surface of the wall on which the rack is mounted. This feature allows the rack to be used to support a bicycle the tires of which are resting on a floor surface, for example to lock an e-bike to the wall without having to lift the e-bike off of the floor.

In another aspect, the disclosure features methods of using such bicycle racks. For example, the disclosure features a method that includes (1) mounting on a wall surface a bicycle rack, the rack comprising: (a) a support member having a first portion configured to be mounted on a wall and a second portion, disposed at an angle relative to the first portion, configured to support the pedal of a bicycle; and (b) a cover member pivotably mounted on the first portion of the support member, the cover member being configured to move between an open position in which the support member is uncovered and a closed position in which the support member is covered; (2) mounting a bicycle in the rack by placing a pedal of the bicycle on the support member; and (3) moving the cover member to the closed position.

In some implementations, the method further includes locking the cover member in the closed position.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DESCRIPTION OF THE DRAWINGS

In FIG. 1 the bicycle is suspended above the floor by the rack.

DETAILED DESCRIPTION

Figure 1:
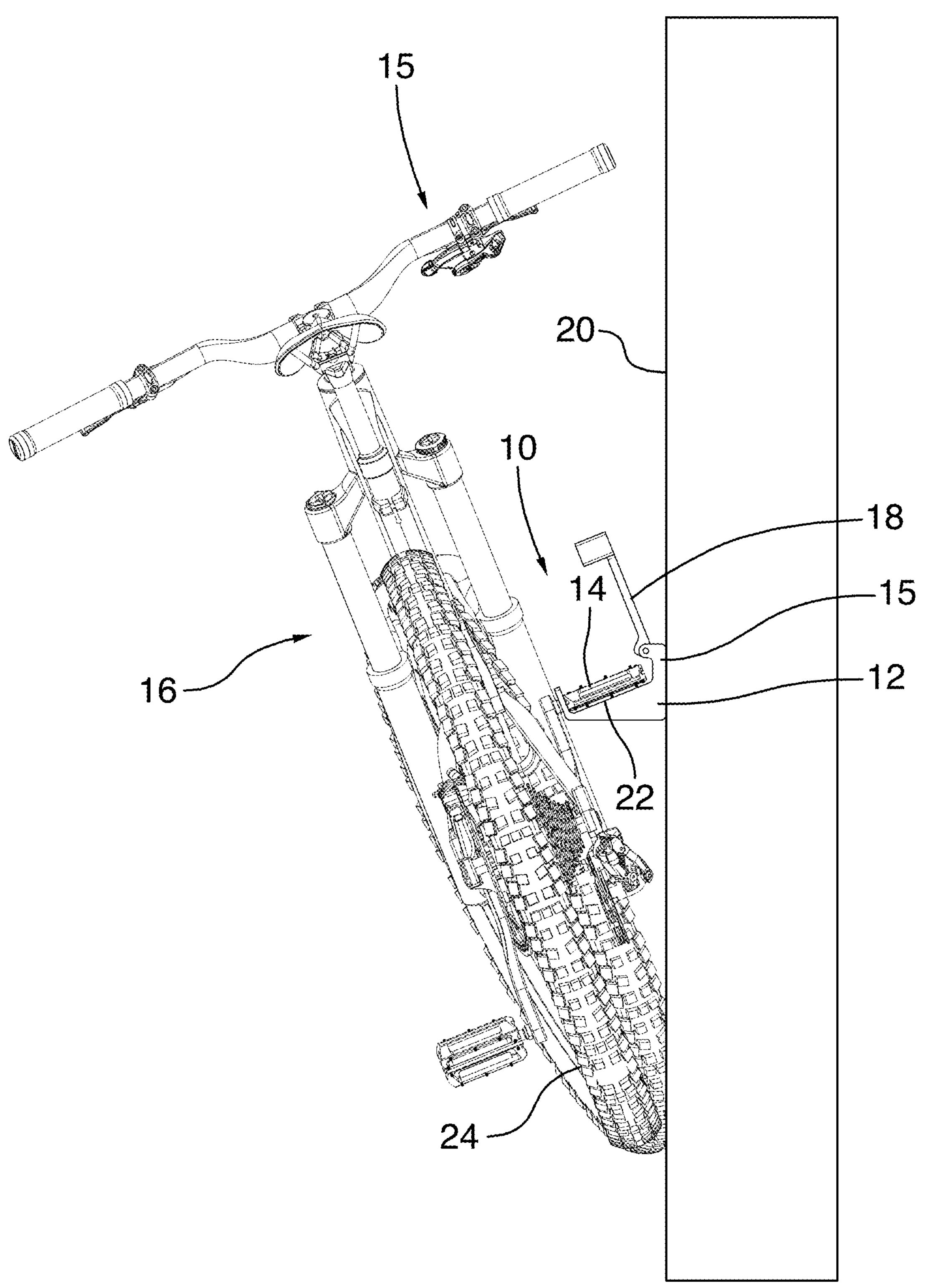
FIG. 1 is a perspective view of a wall mounted bicycle rack mounted on a wall with the rack in an open position and a bicycle mounted on the rack.
Figure 2:
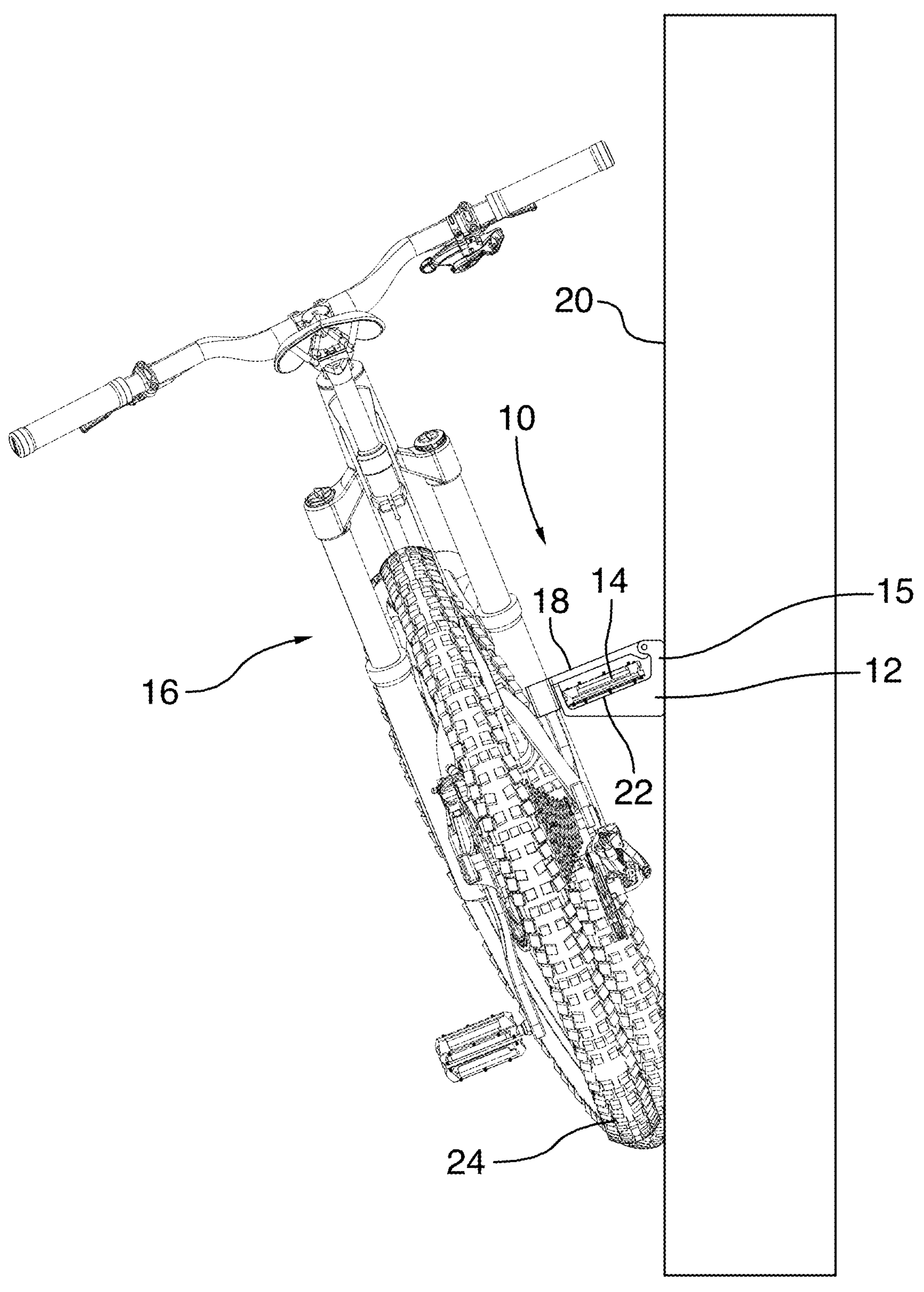
FIG. 2 is a perspective view of the bicycle rack shown in FIG. 1 but with the rack in a closed position.

Referring to FIGS. 1 and 2, a bicycle rack 10 according to one implementation includes a body 12 configured to receive and support a pedal 14 of a bicycle 16, and a locking cover member 18 pivotably mounted on the body 12. The body 12 includes a first portion 15 that is configured to be mounted to a wall 20, as shown. The cover member 18 is mounted on the body 12 to be movable between an open position (FIG. 1) and a closed position (FIG. 2). The body 12 includes an angled support surface 22 that is configured to support the pedal at an angle that allows a lower portion of the wheels 24 of the bicycle to contact the wall 20 and stabilize the bicycle, while providing sufficient clearance from the wall for the handlebars 25 of the bicycle.

Figure 3:
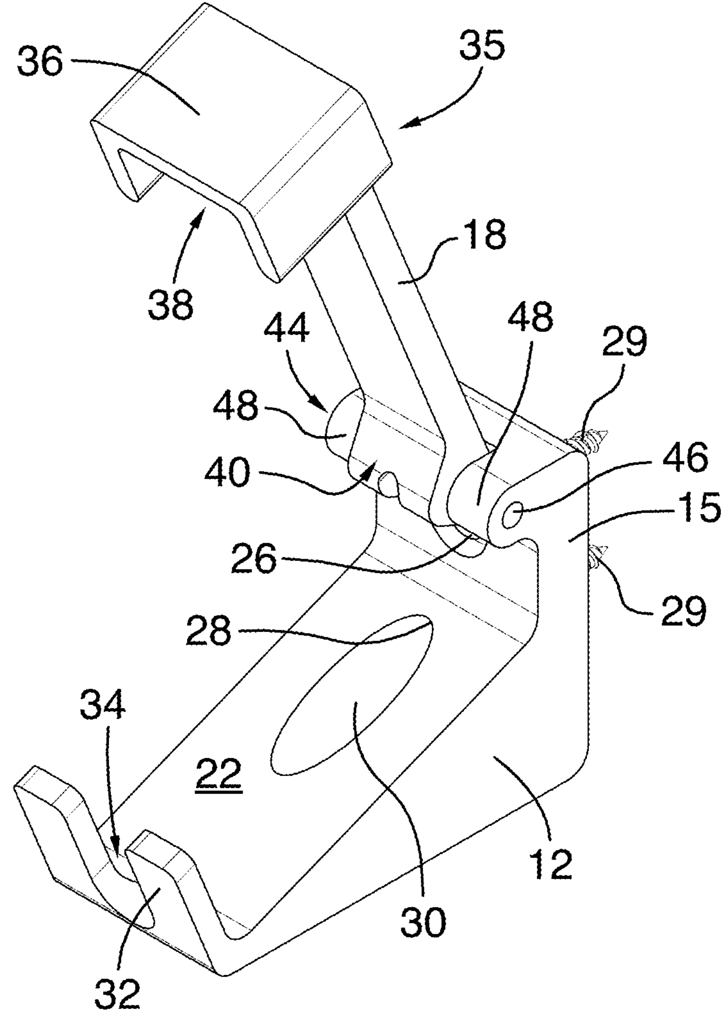
FIG. 3 is a perspective view of a wall mounted bicycle rack according to one implementation, shown in the open position of FIG. 1.
Figure 3A:
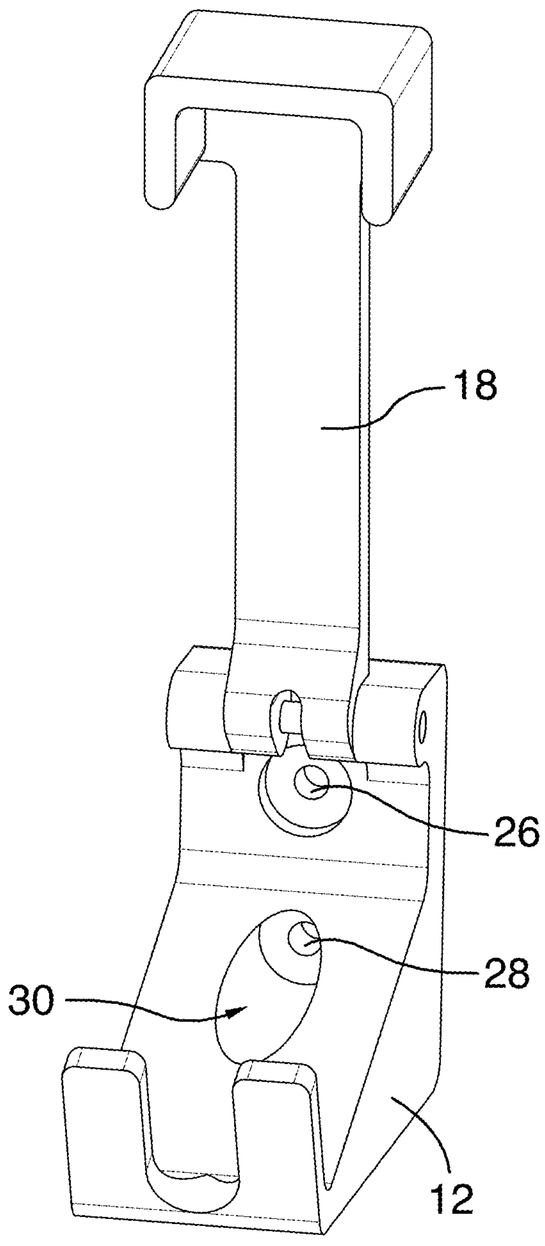
FIG. 3A is an alternative perspective view similar to FIG. 3 but with the bolts removed to show the bolt holes used to mount the rack.
Figure 4:
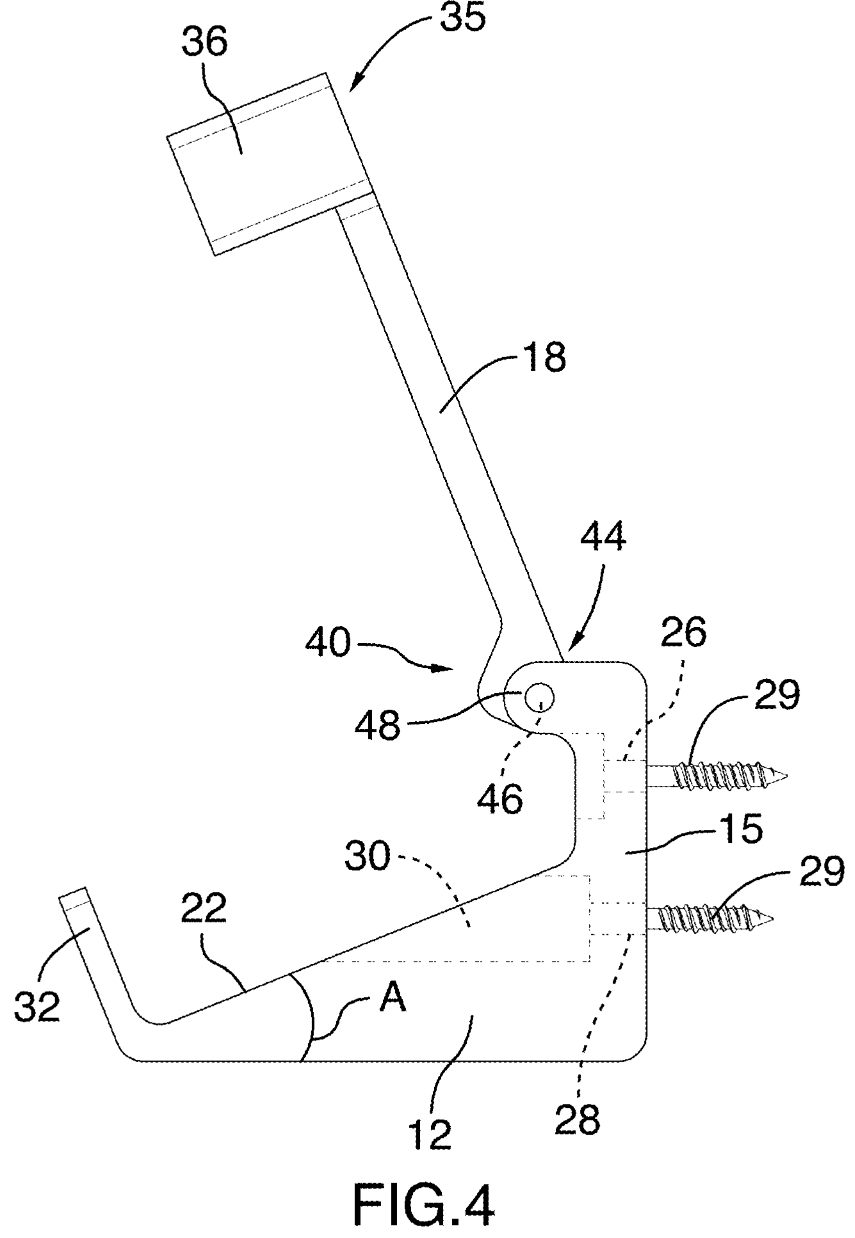
FIG. 4 is a side view of the bicycle rack shown in FIG. 3.
Figure 7:
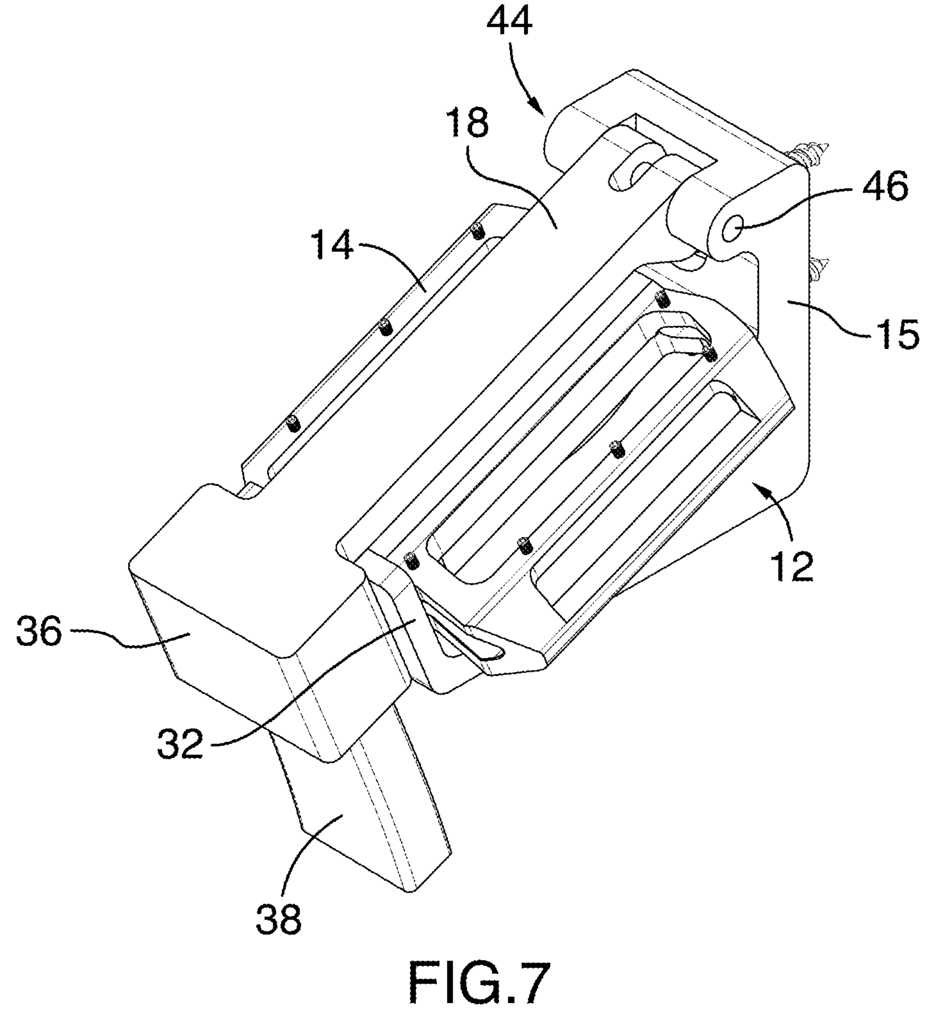
FIG. 7 is a perspective view of the bicycle rack as shown in FIG. 5 with the rack in the closed position of FIG. 2
Figure 8:
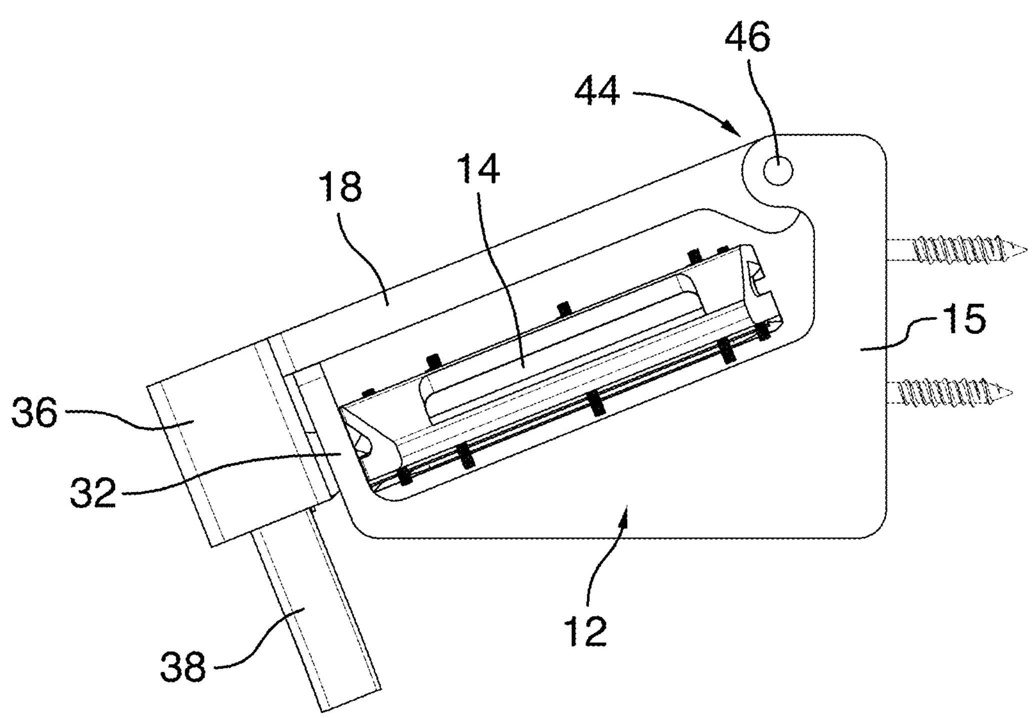
FIG. 8 is a side view of the closed bicycle rack shown in FIG. 7.

Referring now to FIGS. 3 and 4, the body 12 includes two through holes 26, 28 (seen best in FIG. 3A) configured to receive threaded fasteners 29 (e.g., screws or bolts) to secure the body 12 to the wall 20. The upper hole 26 will be inaccessible due to the cover member 18 when the rack is closed (FIGS. 7-8). The lower hole 28 will also be inaccessible when the rack is closed because the opening of the lower hole is recessed within the body 12. A fastener may be inserted into or removed from the lower hole 28 via open area 30 (FIG. 3A). Because the holes 26 and 28 are protected in this way a potential thief cannot remove the locked rack from the wall by unscrewing the fasteners.

The angled support surface 22 is configured to support the pedal in a position that will result in the bicycle 16 being in a stable position on the wall, for example as shown in FIGS. 1-2. In some implementations the angle A (FIG. 4) of surface 22 is from about 5 to 50 degrees, in some cases from about 30 to 50 degrees.

Figure 5:
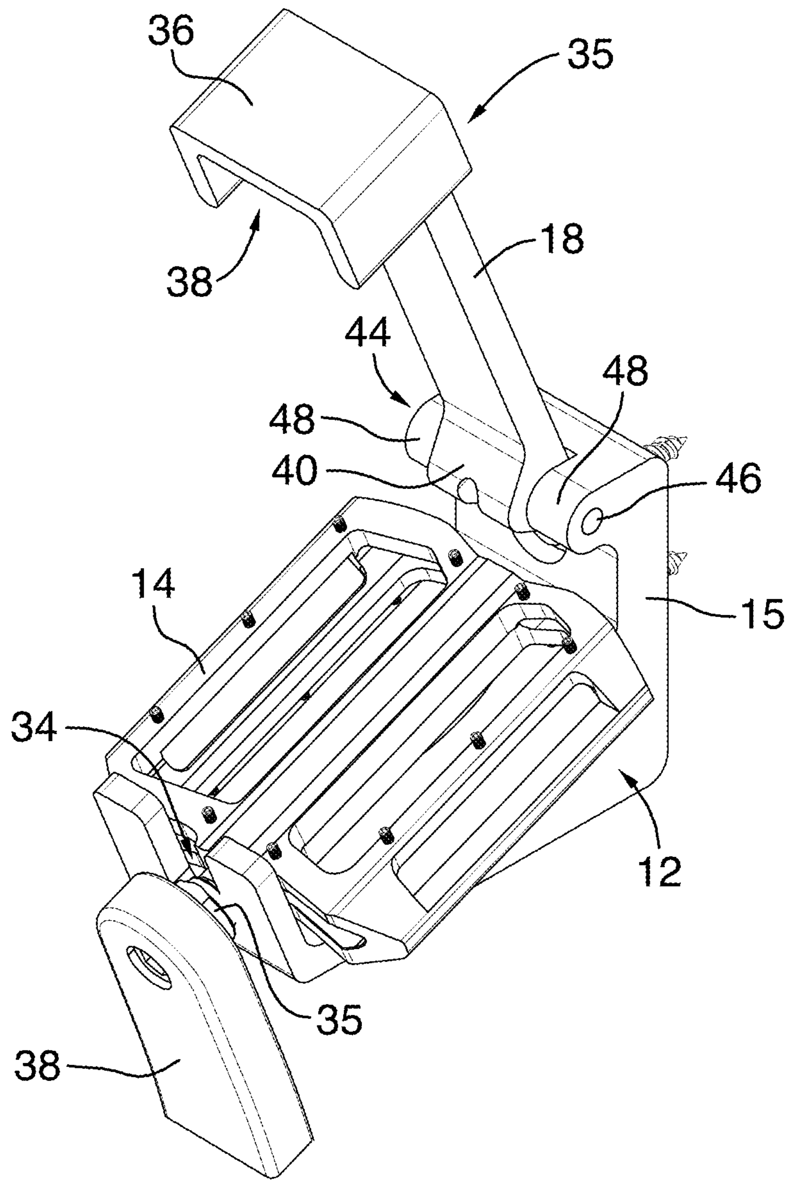
FIG. 5 is a perspective view of the bicycle rack shown in FIG. 3 with a pedal and crank arm (partial view) in place in the rack.

As shown in FIGS. 3 and 4, the body 12 also includes a forked portion 32 that defines a generally U-shaped open area 34 (FIG. 3). As can be seen in FIG. 5, the open area 34 is configured to receive the spindle 36 (also referred to as an axis) of the pedal 14 where the spindle is threadedly attached to the crank arm 38. This engagement of the spindle 36 in the open area 34 holds the pedal securely in place in the body 12, prevents the pedal from sliding off the angled support surface 22, and prevents lateral movement the pedal (e.g., by a thief) so that the pedal cannot be removed when the cover member is in the closed position.

Referring again to FIGS. 3 and 4, the cover member 18 includes, at its distal end 35, a generally cup-shaped portion 36 that defines an open area 38. The cup-shaped portion 36 is configured so that the open area 38 fits over the top of the crank arm 38 when the cover member is in the closed position (FIGS. 7 and 8). Thus, the cup-shaped portion 36 covers up the area where the spindle 35 (FIG. 6) is threaded onto the crank arm 38 and thus prevents a thief from stealing the bicycle by unthreading the pedal 14 from the crank arm 38.

At its proximal end 40 the cover member 18 is pivotably attached to the first portion 15 of the body 12 by a hinge 44. The hinge 44 is formed by insertion of a pin 46 through aligned holes (not visible) in the distal end 40 of the cover member 18 and in arms 48 of the first portion 15. The pin may be welded in place or otherwise made difficult to remove to enhance the theft-resistance of the bicycle rack.

To facilitate insertion of the pedal into the rack by a user it is generally preferred that the cover member be biased towards its open position, such that it will stay in the position shown in FIGS. 3 and 4, rather than flopping down, until closed by a user. This may be accomplished by configuring the hinge to be relatively stiff. However, in some implementations the cover member is spring loaded, so that it moves readily to the open position when the user unlatches or unlocks the rack.

Figure 9:
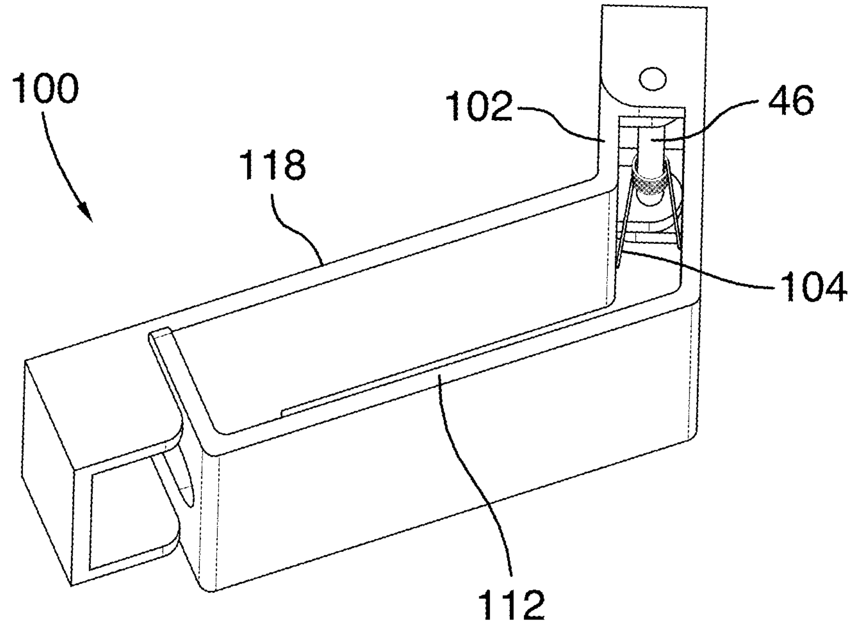
FIG. 9 is a perspective view of a bicycle rack according to an alternative implementation, showing a spring-loading mechanism.
Figure 9A:
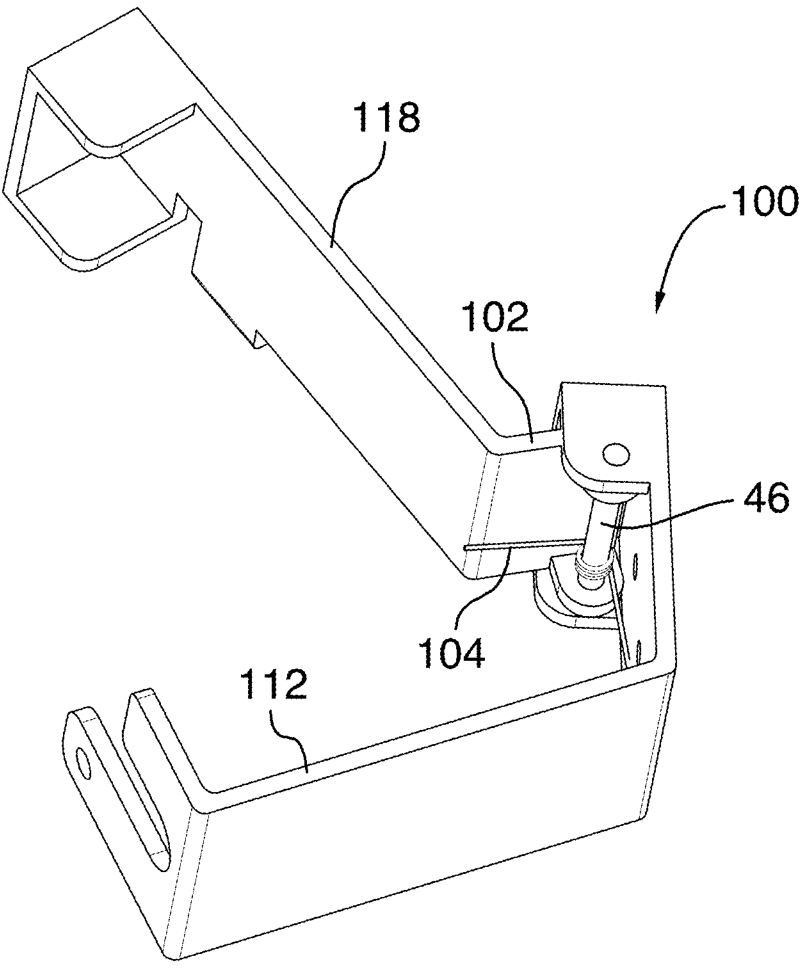
FIG. 9A is a perspective view of the bicycle rack shown in FIG. 9 in an open position.

A bicycle rack 100 having a spring loading mechanism is shown in FIGS. 9-9A. In the implementation shown in FIGS. 9-9A a cover member 118 includes a compression member 200, formed by a bend in the proximal end of the cover member 118. The compression member 102 is configured to compress a torsion spring 104 that is mounted on pin 46. When the cover member 118 is not secured in the closed position (FIG. 9) by a latch or lock (not shown) the torsion spring 104 expands, biasing the cover member 118 into the open position shown in FIG. 9A.

Figure 9B:
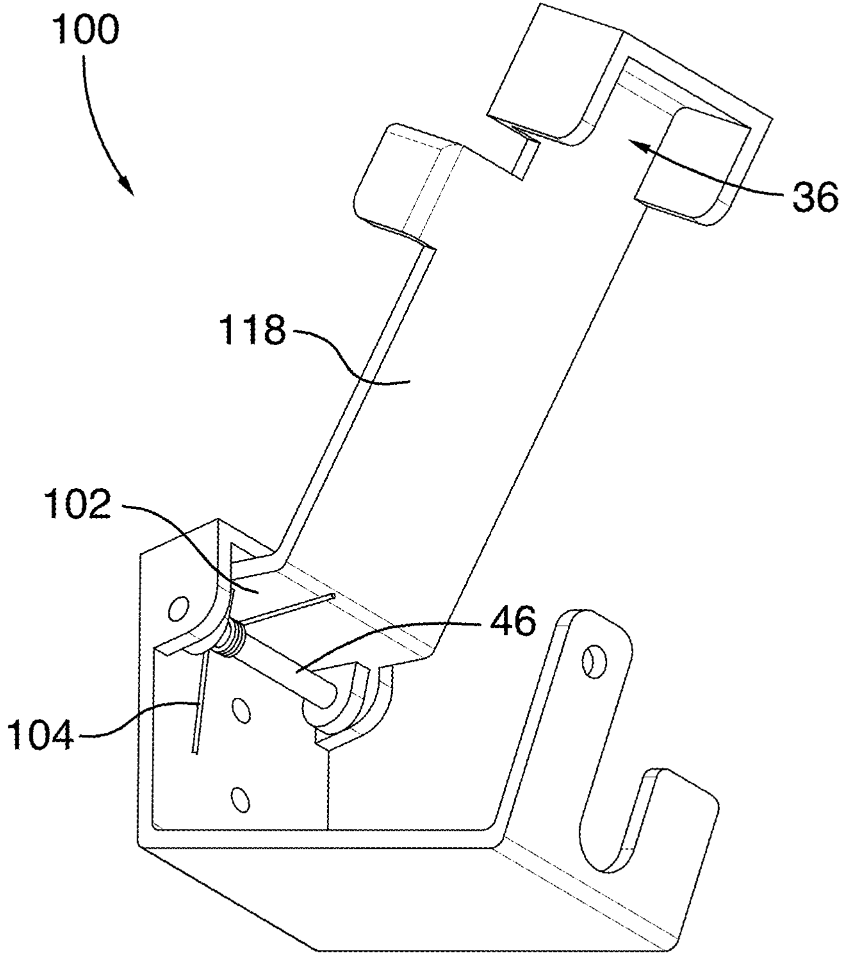
FIG. 9B is similar to FIG. 9A but taken from a different direction.

FIGS. 9-9B also illustrate that the bicycle rack may have a different type of body than the body 12 shown in FIGS.

Figure 6:
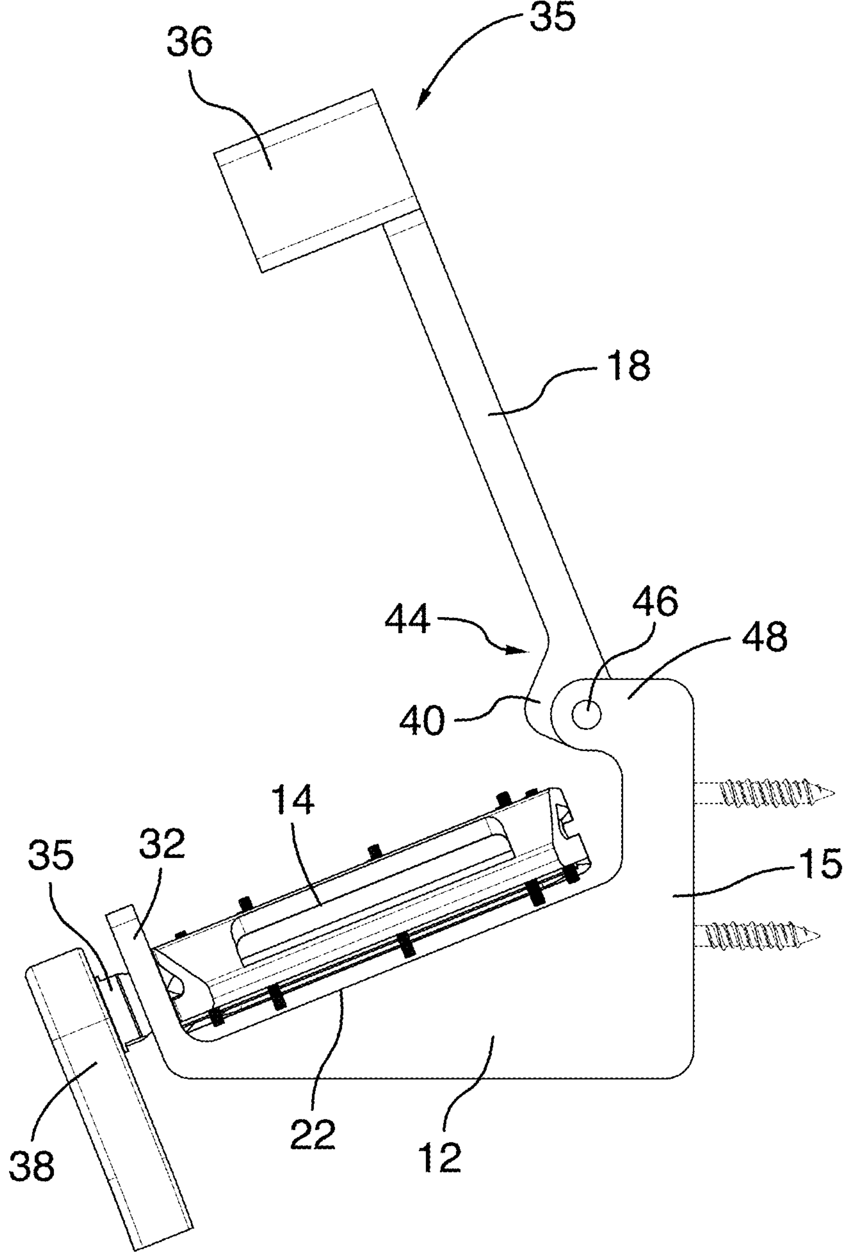
FIG. 6 is a side view of the bicycle rack, pedal and crank arm shown in FIG. 5.

1-8. In the implementation shown in FIGS. 9-9A, for example, the body 112 is a simple flat plate, whereas body 12 is more wedge shaped in cross-section (FIG. 6). FIG. 9B also provides a clear view of the cup-shaped portion 36 discussed above with regard to the implementation shown in FIGS. 1-8.

In some preferred implementations the cover member may be locked in the closed position.

Figure 10:
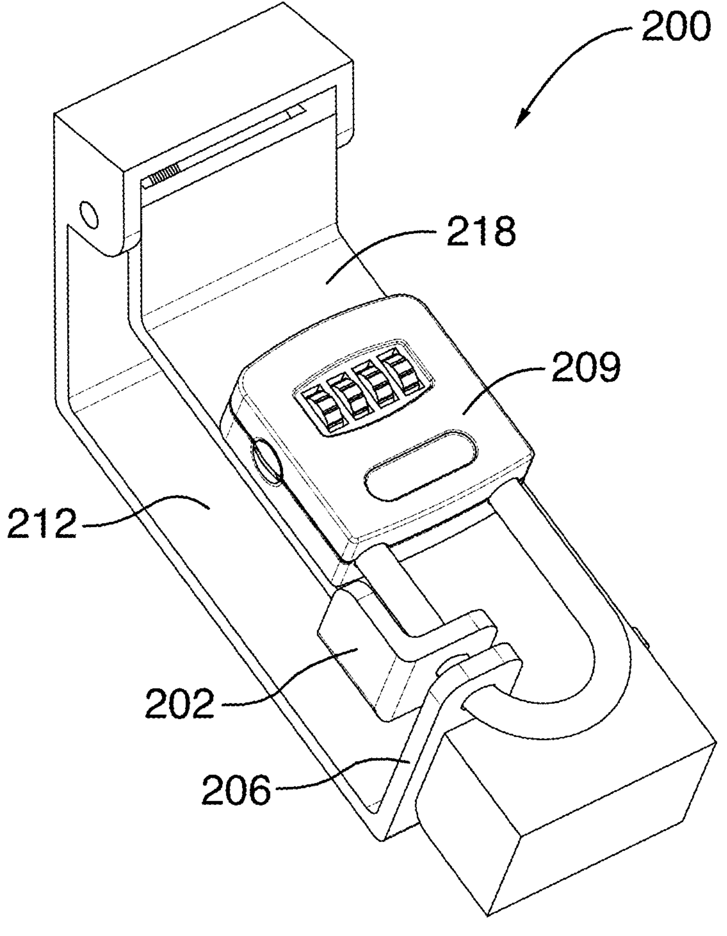
FIG. 10 is a perspective view showing a bicycle rack according to one implementation in which a removable lock is used.
Figure 10A:
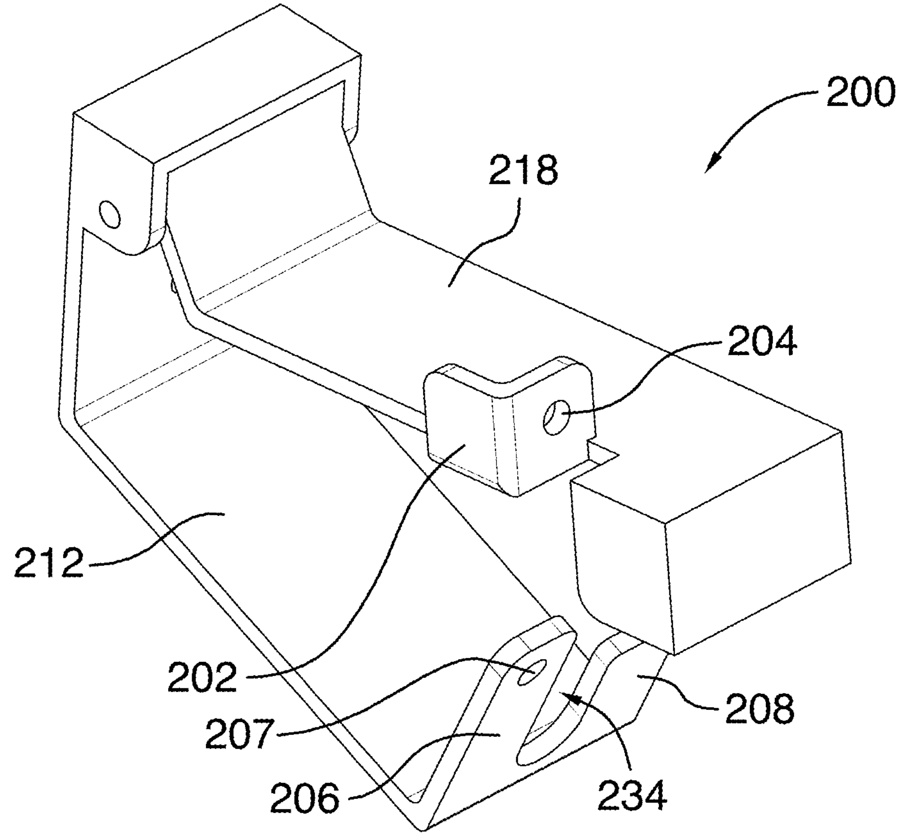
FIG. 10A is perspective view of the bicycle rack shown in FIG. 10 in a partially open position with the lock removed.

One such implementation is shown in FIGS. 10-10A. In this implementation, a bicycle rack 200 includes a cover member 218 that has an ear 202 extending upwardly and outwardly therefrom. The ear 202 includes an aperture 204, best seen in FIG. 10A. The body 212 includes a leg 206 which is longer than adjacent leg 208, the legs 206 and 208 together defining a U-shaped open area 234 similar to the U-shaped open area 34 described above with reference to FIGS. 1-8. Leg 206 includes an aperture 207, best seen in FIG. 10A, which is configured to align with aperture 204 when the rack is closed. This allows a lock (e.g., a padlock 209 as shown, or a cable lock or other type of lock) to be threaded through the aligned apertures as shown in FIG. 10.

In some cases, it may be desirable to have a lock that is permanently mounted on the bicycle rack, and it may also be desirable to have a latching mechanism that holds the bicycle rack in its closed position, resisting the upward biasing force of the spring loading mechanism. Various implementations that include these features are shown in FIGS. 11-13A.

Figure 11:
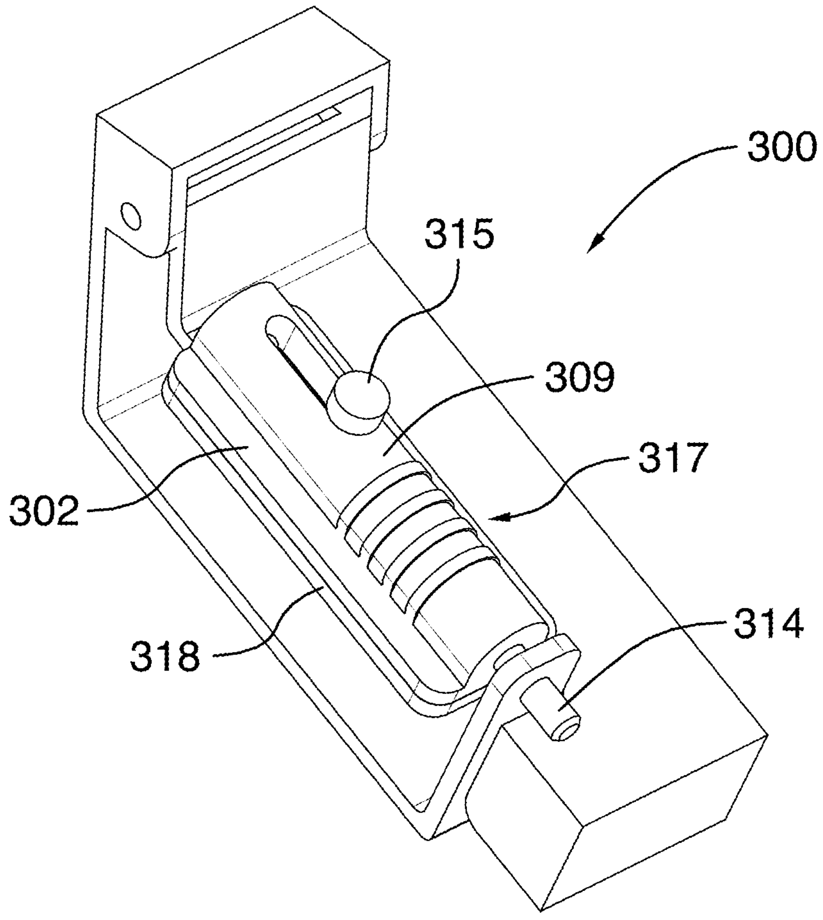
FIG. 11 is a perspective view of a bicycle rack having an alternative type of locking mechanism.
Figure 11A:
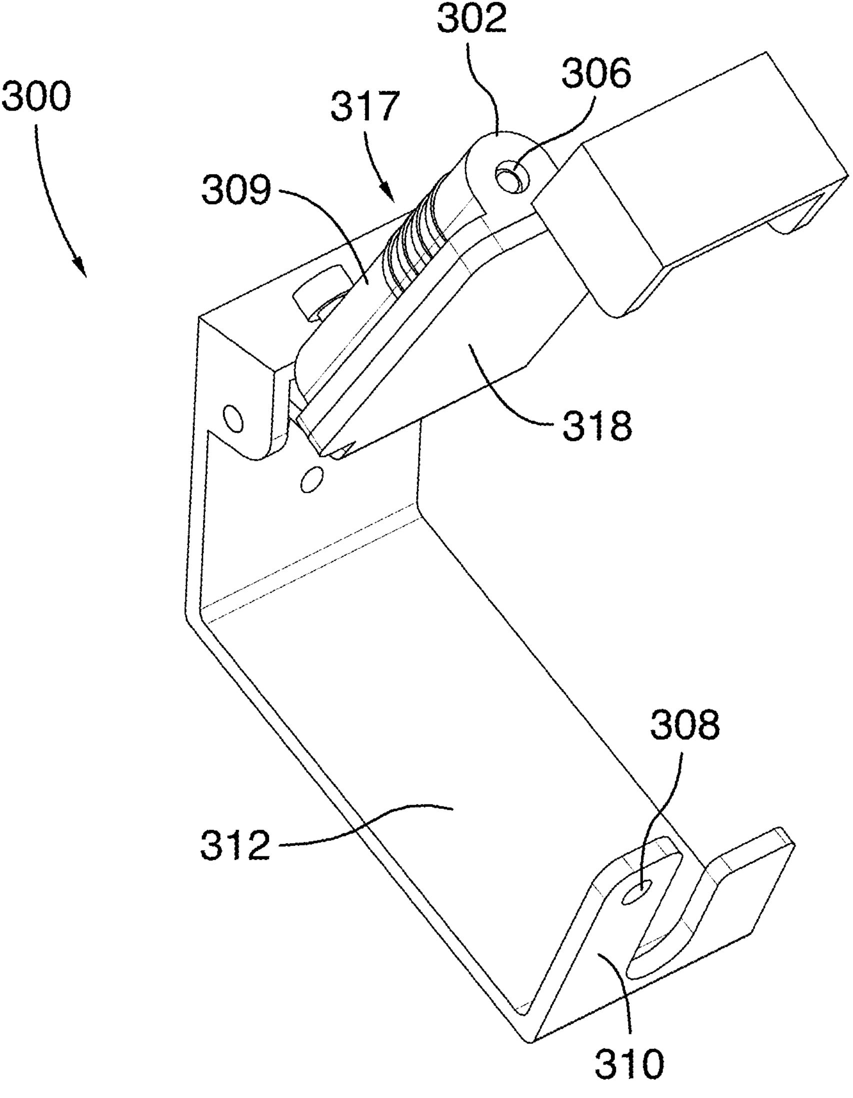
FIG. 11A is a perspective view of the bicycle rack of FIG. 11 in an open position.
Figure 11B:
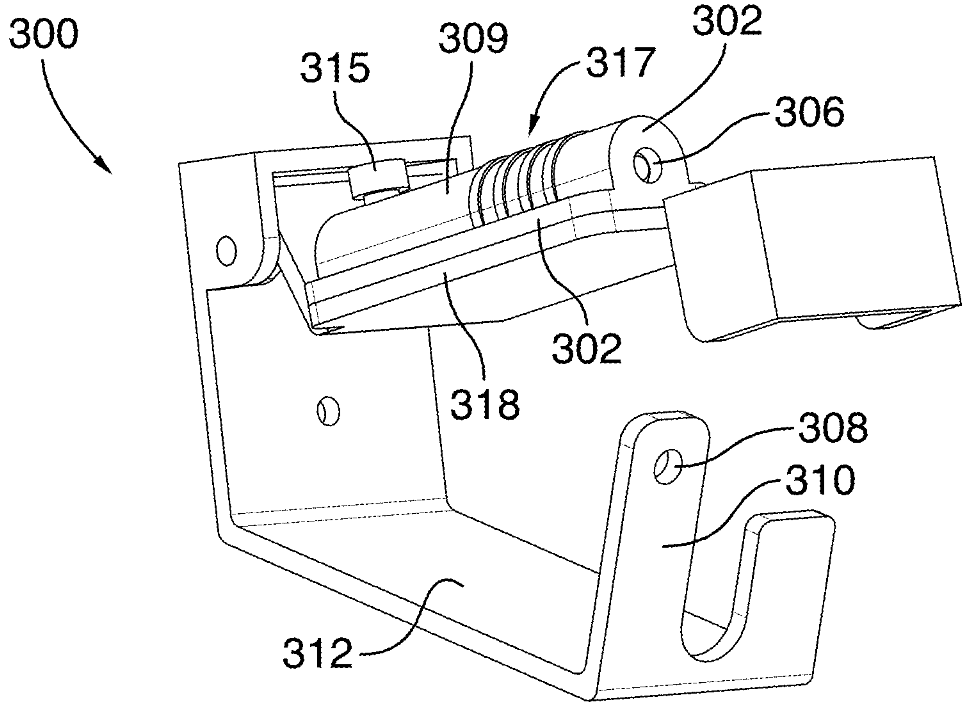
FIG. 11B is a perspective view of the bicycle rack in a partially open position.

Referring first to FIGS. 11-11B, a bicycle rack 300 includes a barrel-style combination lock 309 that is permanently mounted (e.g., welded) onto a plate 302 that is in turn permanently mounted on cover portion 318. Plate 202 includes an ear 304 that includes an aperture 306 (FIG. 11B). Aperture 306 is configured to align with a corresponding aperture 308 in an extended leg 310 of the body 312. As shown in FIG. 11, when the bicycle rack is in a closed position apertures 306 and 308 are aligned and a latch member 314 slides through the apertures to secure the rack in the closed position. Actuation of the latch member 314 may be manual, using knob 315 to slide the latch member forward, or the latch member may be biased to the extended position by a spring (not shown) such that the latch member is retracted manually using knob 315 and then springs into place automatically when the knob is released. The latch member 314 may be locked in the extended position using a barrel-style combination lock 317 shown diagrammatically in FIGS. 11-11B.

Figure 12:
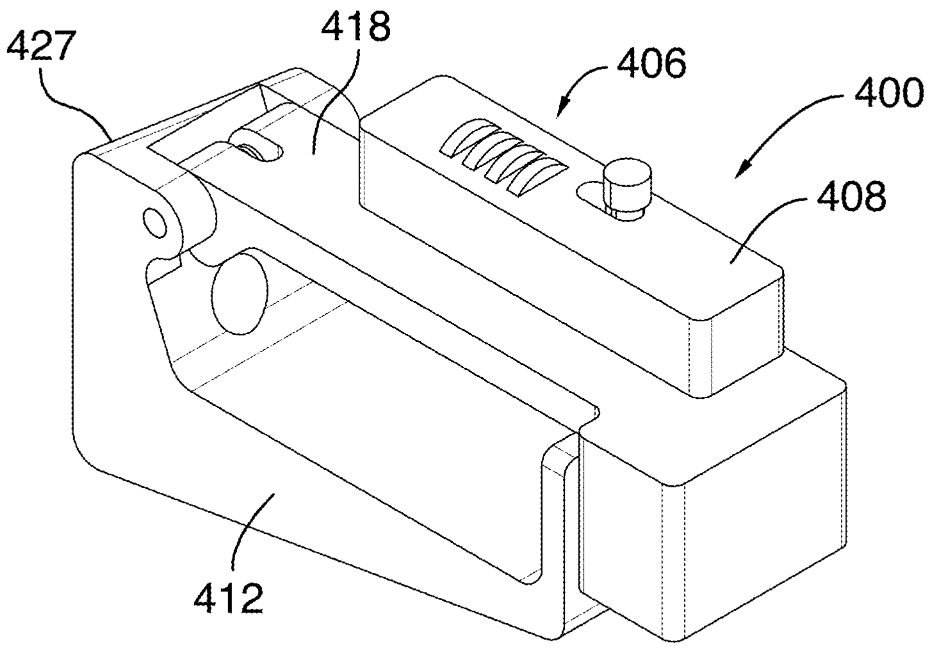
FIG. 12 is a perspective view of a bicycle rack with another type of locking mechanism, including a shielded latch for enhanced theft protection.
Figure 12A:
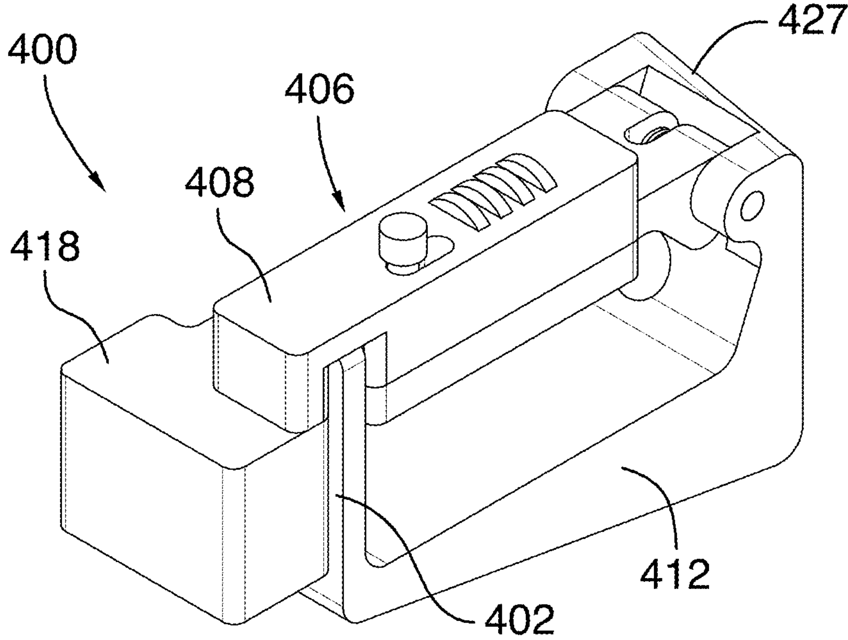
FIGS. 12A and 12B are perspective views of the bicycle rack shown in FIG. 12, taken from different directions.
Figure 12B:
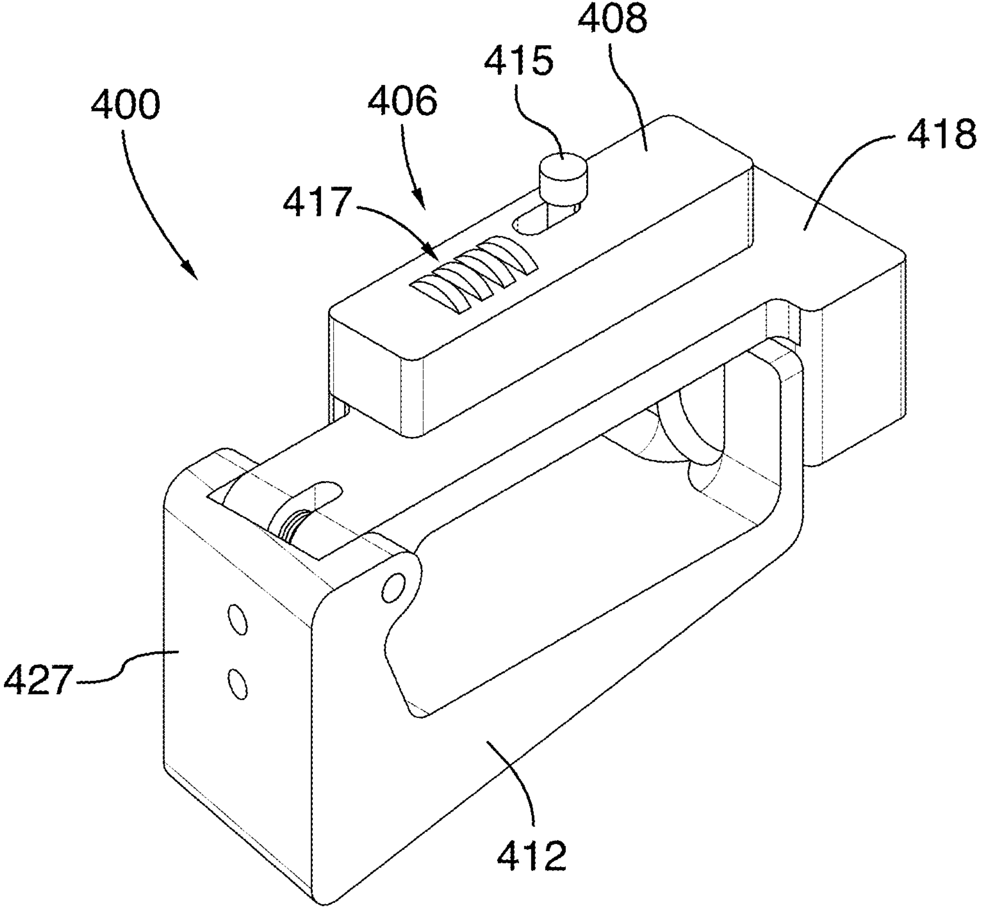
Figure 12C:
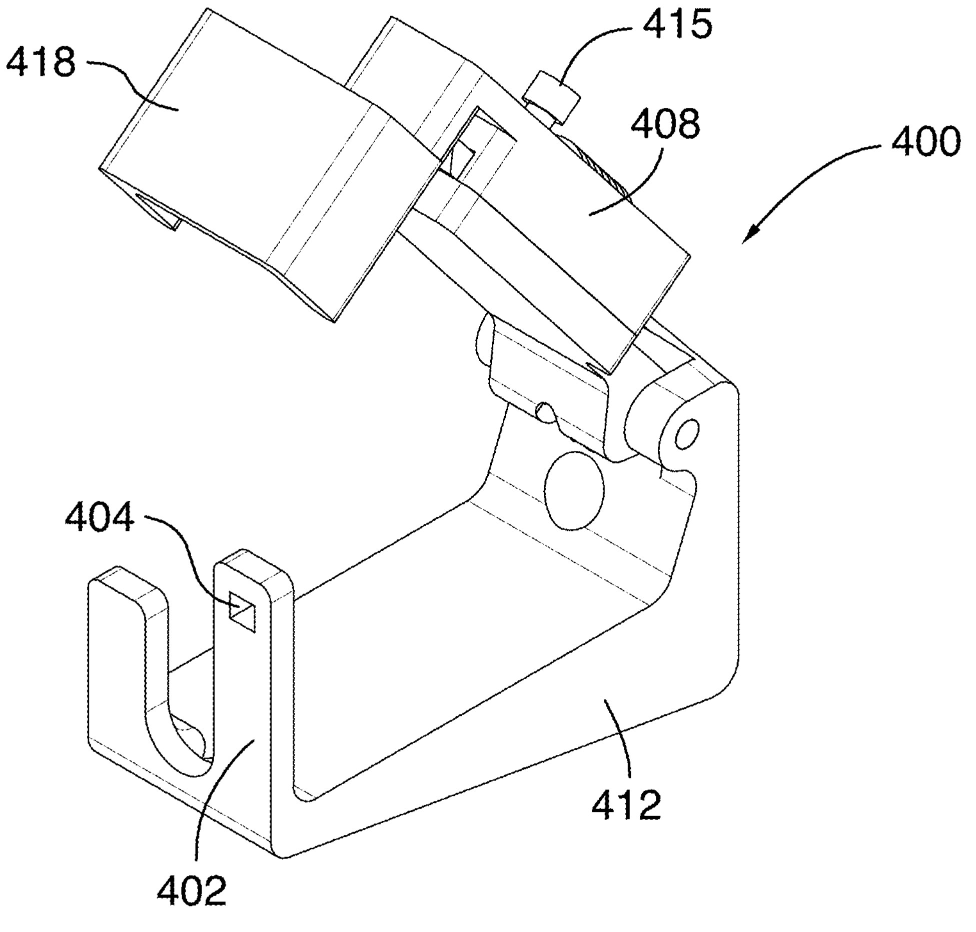
FIG. 12C is a perspective view of the bicycle rack shown in FIG. 12 in an open position.
Figure 12D:
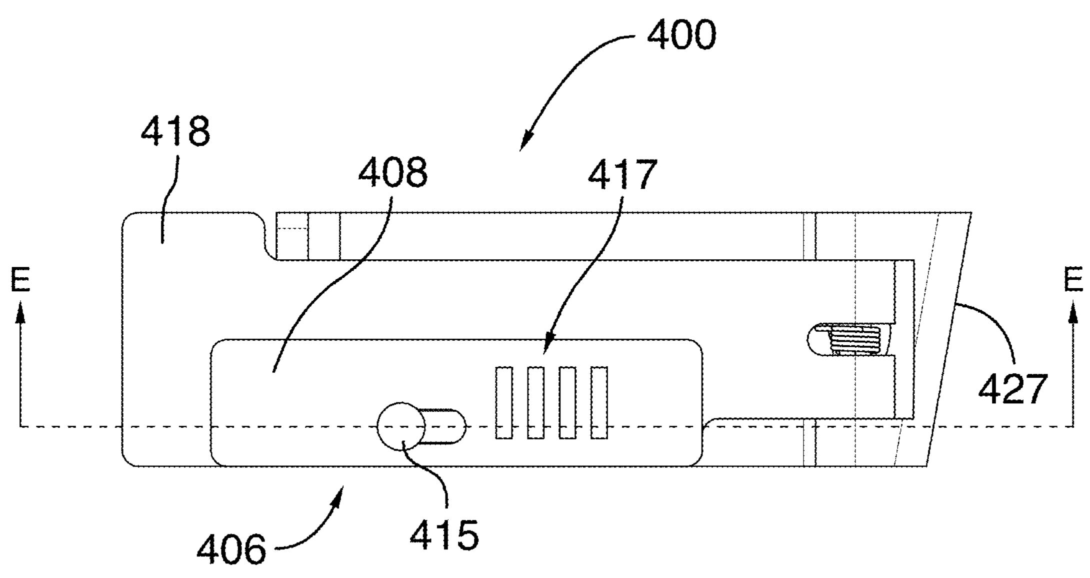
FIG. 12D is a top view of the bicycle rack shown in FIG. 12.
Figure 12E:
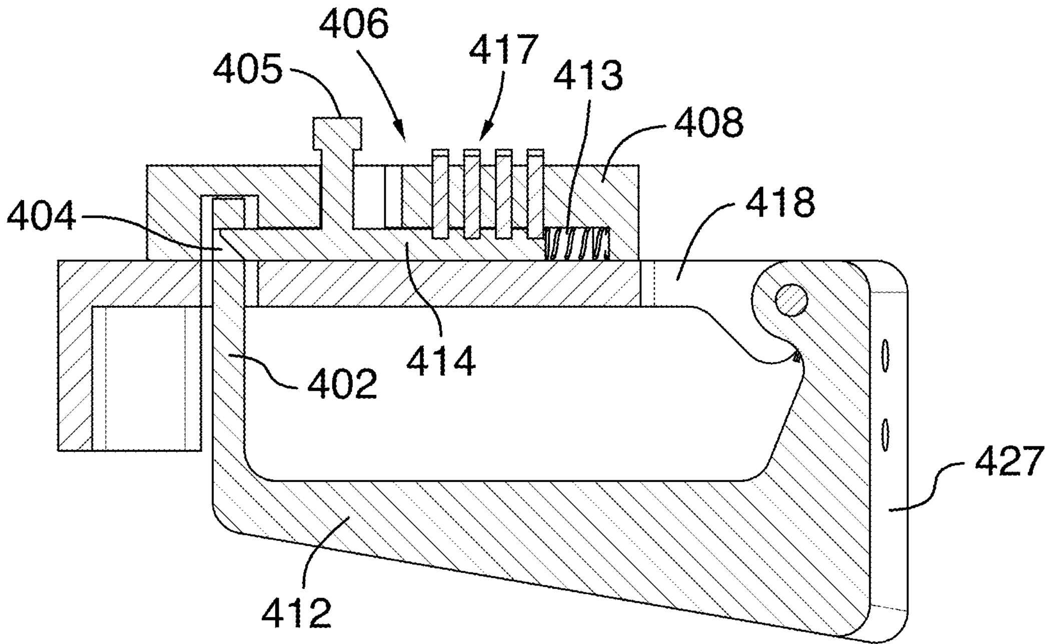
FIG. 12E is a cross-sectional view taken along line E-E in FIG. 12D.

An alternative implementation, in which the latch member is shielded, to prevent a thief from trying to cut through it, is shown in FIGS. 12-12E. In this implementation, bicycle rack 400 includes a base 412 having an extended leg 402 that includes an aperture 404, best seen in FIG. 12C. A locking mechanism 406 is mounted on cover member 418. The locking mechanism 406 includes a housing 408 that is permanently mounted on the cover member 418 (e.g., by welding) and shields the internal components of the locking mechanism from a potential thief as well as protecting them for inadvertent damage.

The internal components of the locking mechanism 406 are shown in FIG. 12E. Similar to the lock described above with reference to FIGS. 11-11B, the locking mechanism includes a latch member 414 and a knob 415 that is integral with the latch member. In this implementation, aligned apertures are not needed; instead, the latch member simply slides into engagement with aperture 404, as shown in FIG. 12E. The latch member is biased towards this extended, latched position by spring 413. A barrel-style combination lock 417 locks the latch member in this position, resisting movement of the latch member by the knob.

Figure 13:
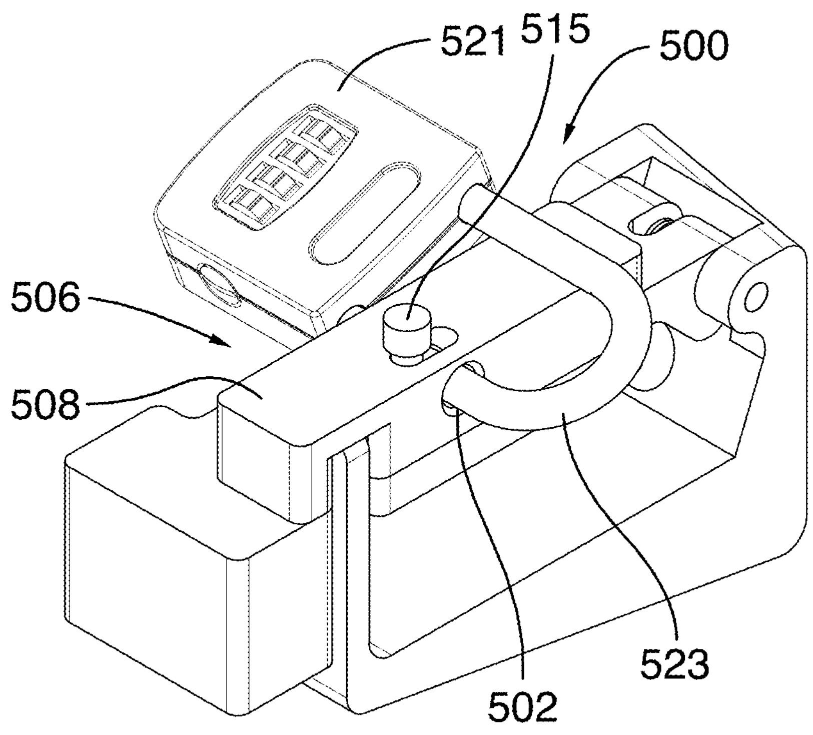
FIG. 13 is a perspective view of a bicycle rack with yet another type of locking mechanism, in which the lock is removable, and the bicycle rack will remain in a latched, closed position when the lock is removed.
Figure 13A:
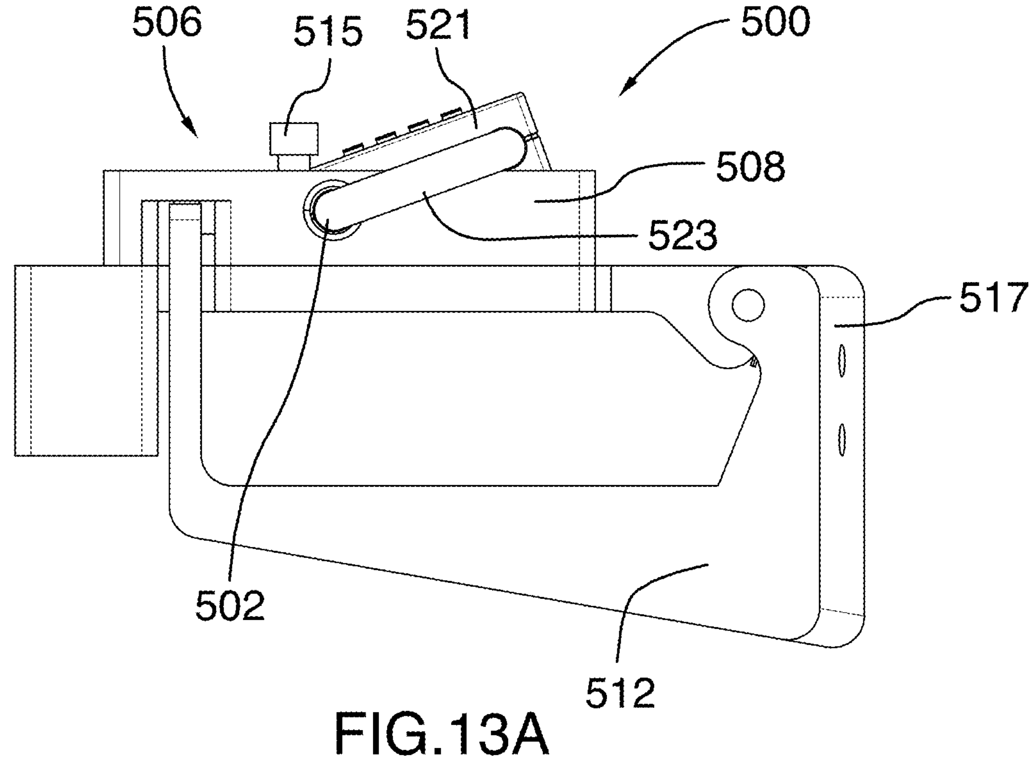
FIG. 13A is a side view of the bicycle rack shown in FIG. 13.

In another alternative implementation, shown in FIGS. 13-13A. In this implementation, bicycle rack 500 includes a locking mechanism 506 similar to that described above with reference to FIGS. 12-12E, except that the barrel-style combination lock is replaced by a removable padlock 521. Padlock 521 is threaded through openings 502 in housing 508. The shank 523 of the padlock prevents movement of the knob 515 and thus of the latch member (not shown) that is integral therewith.

Figure 14:
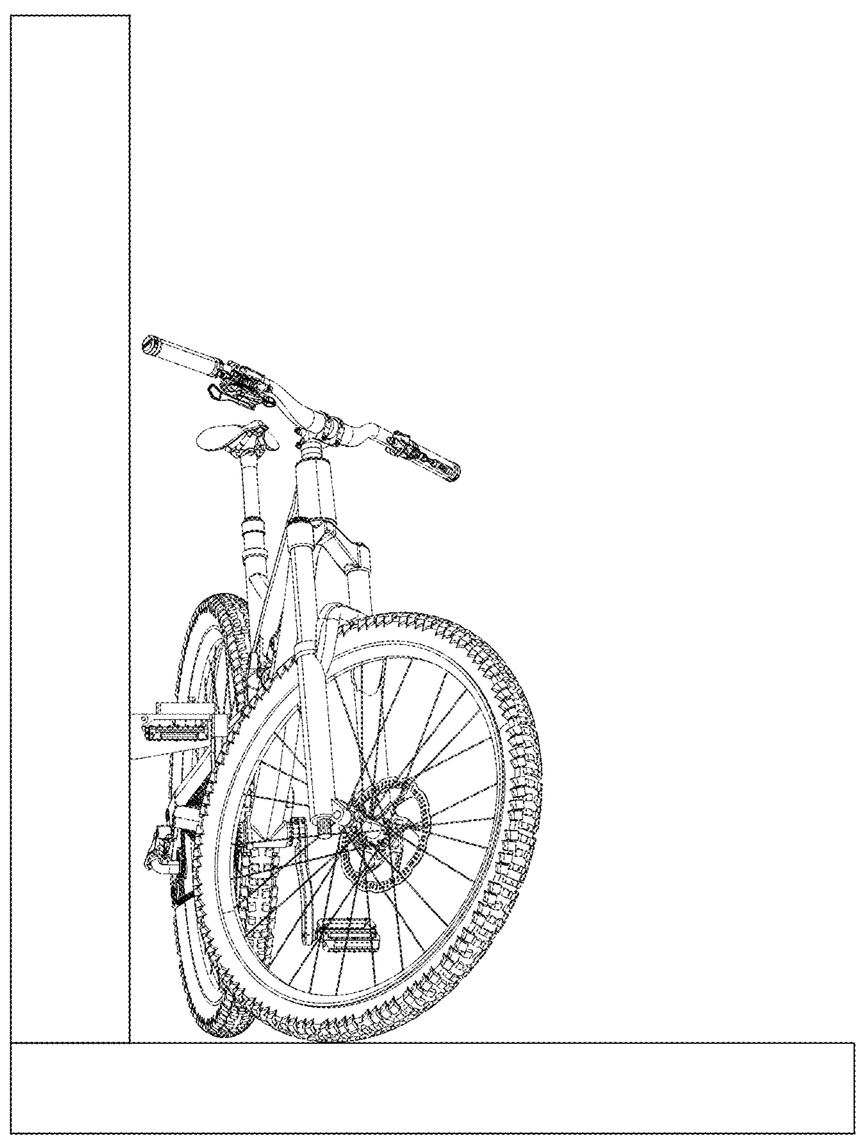
FIG. 14 is a perspective view showing a bicycle rack according to another implementation supporting a bicycle the tires of which are resting on a floor surface.
Figure 14A:
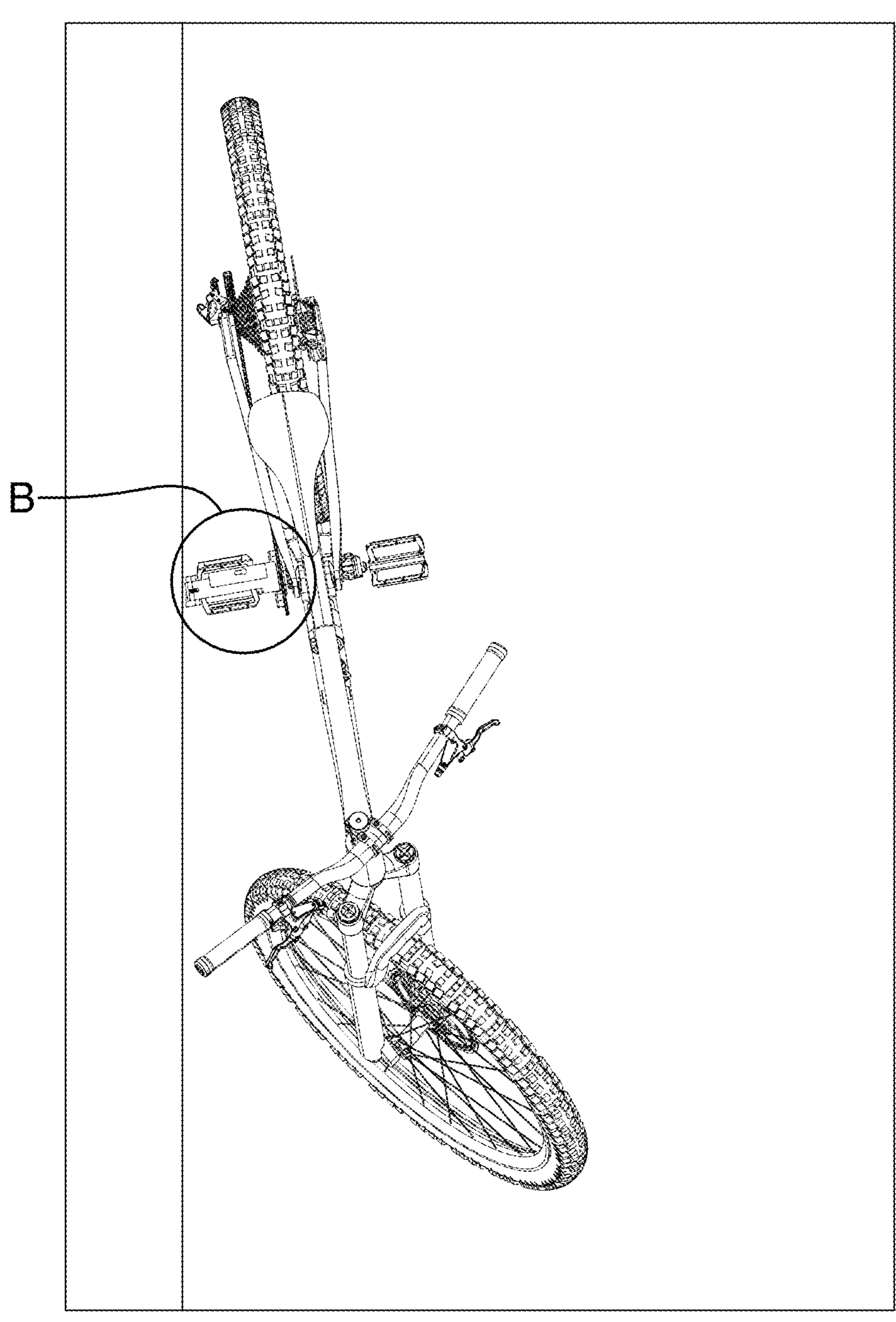
FIG. 14A is a top view of the bicycle rack and bicycle shown in FIG. 14.

In some cases, it may be desirable for the bicycle rack to be configured to allow a bicycle to be mounted on the rack with the tires of the bicycle resting on the floor, e.g., as shown in FIGS. 14-14A. For example, this may be useful where the bicycle is heavy, as is the case with many e-bikes, or if the bicycle user lacks upper body strength. In the implementation the rack can be used, for example, to lock an e-bike securely to a garage wall without the need to lift the bike.

Figure 14B:
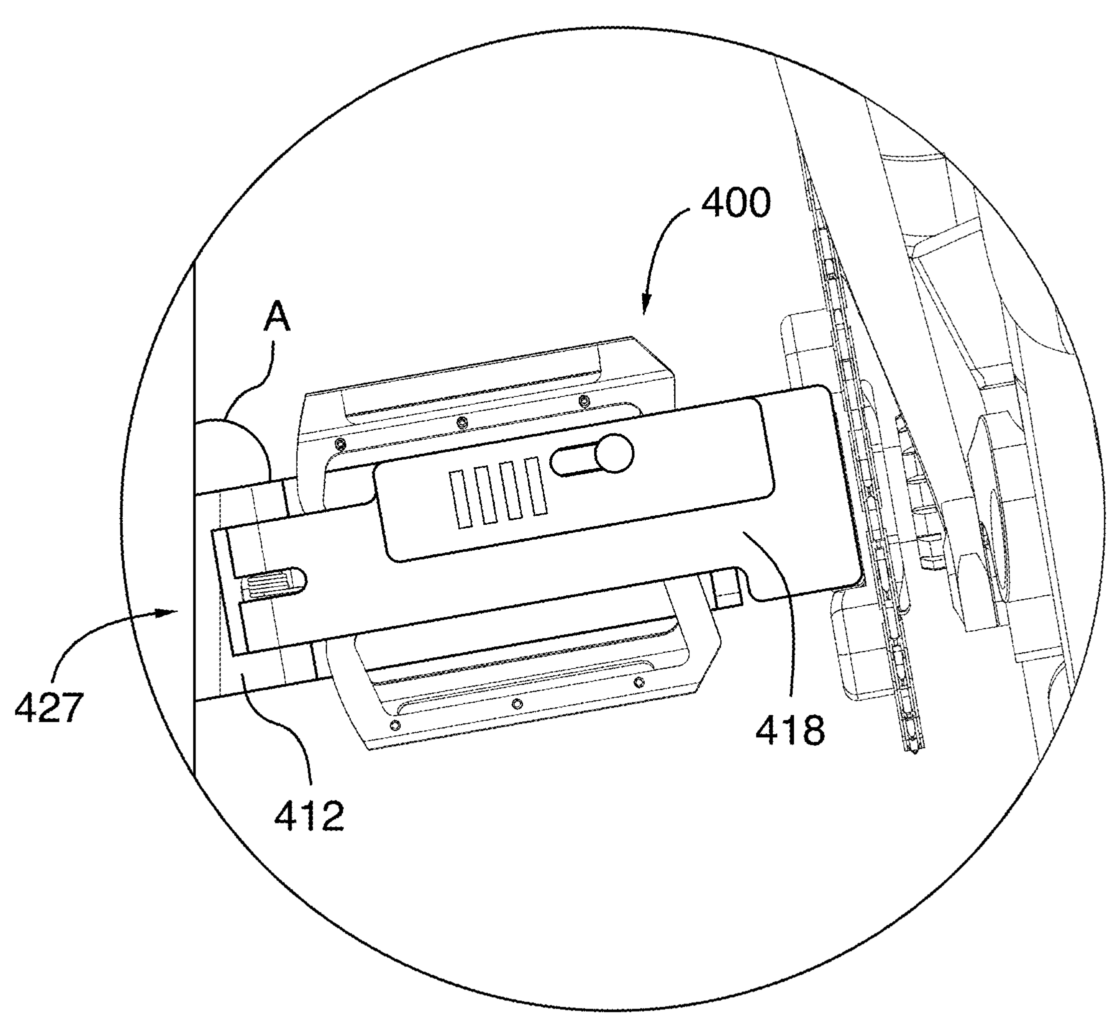
FIG. 14B is an enlarged detail view of area B in FIG. 14A.

In this case, it may be necessary for the body 412 of the bicycle rack 400 (shown in FIGS. 12-12E and described above) to have an angled rear surface 427. This angled rear surface positions the bicycle such that there is clearance for the handlebars, as shown in FIG. 14A. The angled rear surface causes the longitudinal axis of the body 412 to be disposed at an angle A of less than 90 degrees measured relative to the wall surface on which the rack is mounted, as shown in FIG. 14B. In some implementations angle A is from about 70 to 85 degrees.

The rack may be made of any material that provides adequate strength to support the weight of the bike. In some implementations the material is also selected to resist attempts to cut the material with a hack saw or the like, though in some cases the area in which the bike is mounted would be an unlikely target for a thief prepared to use such tools. Suitable materials include metals, plastics, and composites.

Other Embodiments

A number of embodiments have been described. Nevertheless, it will be understood that various modifications may be made without departing from the spirit and scope of the disclosure.

For example, while various lock configurations are shown in the drawings and discussed above other types of locks or locations of the lock on the rack may be used. If desired, a remotely operable lock may be used, for example an electronic Bluetooth® smart lock may be used, such as a Master Lock® Bluetooth® padlock.

Moreover, other techniques for biasing the cover to its open position may be used, such as other types of springs.

Additionally, other types of hinges can be used, for example a living hinge.

Accordingly, other embodiments are within the scope of the following claims.

What is claimed is:

1. A bicycle rack comprising:

a support member having a first portion, and a second portion, disposed at an angle relative to the first portion, the second portion being configured to support a pedal of a bicycle and having a forked portion configured to receive and support a spindle of the pedal;

a cover member pivotably mounted on the first portion of the support member, the cover member being configured to move between an open position in which the support member is uncovered and a closed position in which the support member is covered and having a generally cup-shaped portion configured to fit over a crank arm coupled with the pedal when the cover member is in the closed position; and a locking mechanism configured to lock the cover member in the closed position;

wherein a distal end of the cover member extends over a distal end of a crank arm of the bicycle when the cover member is closed and is configured to prevent access to a spindle of the pedal.

2. The bicycle rack of claim 1 wherein the locking mechanism includes a first locking feature on the cover member and a second locking feature on the support member.

3. The bicycle rack of claim 2 wherein the first locking feature and second locking feature include apertures on the cover member and support member that align when the cover member is in the closed position, allowing a separate lock to be threaded through the apertures.

4. The bicycle rack of claim 2 wherein the first locking feature includes a locking mechanism mounted on the cover member including a latch member slidably mounted to move between a retracted position and an extended position, and the cover member includes an aperture into which the latch member slides when the latch member is in the extended position and the cover member is in the closed position.

5. The bicycle rack of claim 4 wherein the locking mechanism further includes a lock configured to prevent movement of the latch member.

6. The bicycle rack of claim 5 wherein the lock comprises a barrel-style combination lock.

7. The bicycle rack of claim 4 wherein the latch member is biased toward the extended position.

8. The bicycle rack of claim 1 wherein the cover member is biased toward the open position.

9. The bicycle rack of claim 8 wherein the cover member is biased away from the support member by a torsion spring.

10. The bicycle rack of claim 1 wherein the first portion of the support member includes holes configured to receive threaded fasteners.

11. The bicycle rack of claim 10 wherein the first portion is configured so that the holes are inaccessible when the cover member is in the closed position.

12. The bicycle rack of claim 1 wherein the cover member is pivotably mounted by a hinge.

13. The bicycle rack of claim 12 wherein the hinge comprises aligned openings in the cover member and the first portion and a pin extending through the aligned openings.

14. The bicycle rack of claim 1 wherein the second portion of the support member includes an angled support surface.

15. The bicycle rack of claim 1 wherein the first portion of the support member has an angled rear surface, configured so that a longitudinal axis of the support member is disposed at an angle relative to a surface of the wall on which the rack is mounted.

16. A method of securing a bicycle, the method comprising:

providing a bicycle rack comprising:

(a) a support member having a first portion, and a second portion, disposed at an angle relative to the first portion, the second portion being configured to support the pedal of a bicycle;

(b) a cover member pivotably mounted on the first portion of the support member, the cover member being configured to move between an open position in which the support member is uncovered and a closed position in which the support member is covered, the cover member having a generally cup-shaped portion configured to fit over the crank arm when the cover member is in the closed position; and (c) a locking mechanism configured to lock the cover member in the closed position;

wherein a distal end of the cover member extends over a distal end of a crank arm of the bicycle when the cover is closed, and is configured to prevent access to the spindle of the pedal;

mounting a bicycle in the rack by placing a pedal of the bicycle on the support member;

moving the cover member to the closed position and positioning the cup-shaped portion over the crank arm; and locking the cover member in the closed position.

* * * * *